March 9, 1965 O. H. WILLIFORD 3,172,958
TELEPHONE LINE SUPERVISORY CIRCUIT
Filed April 5, 1960
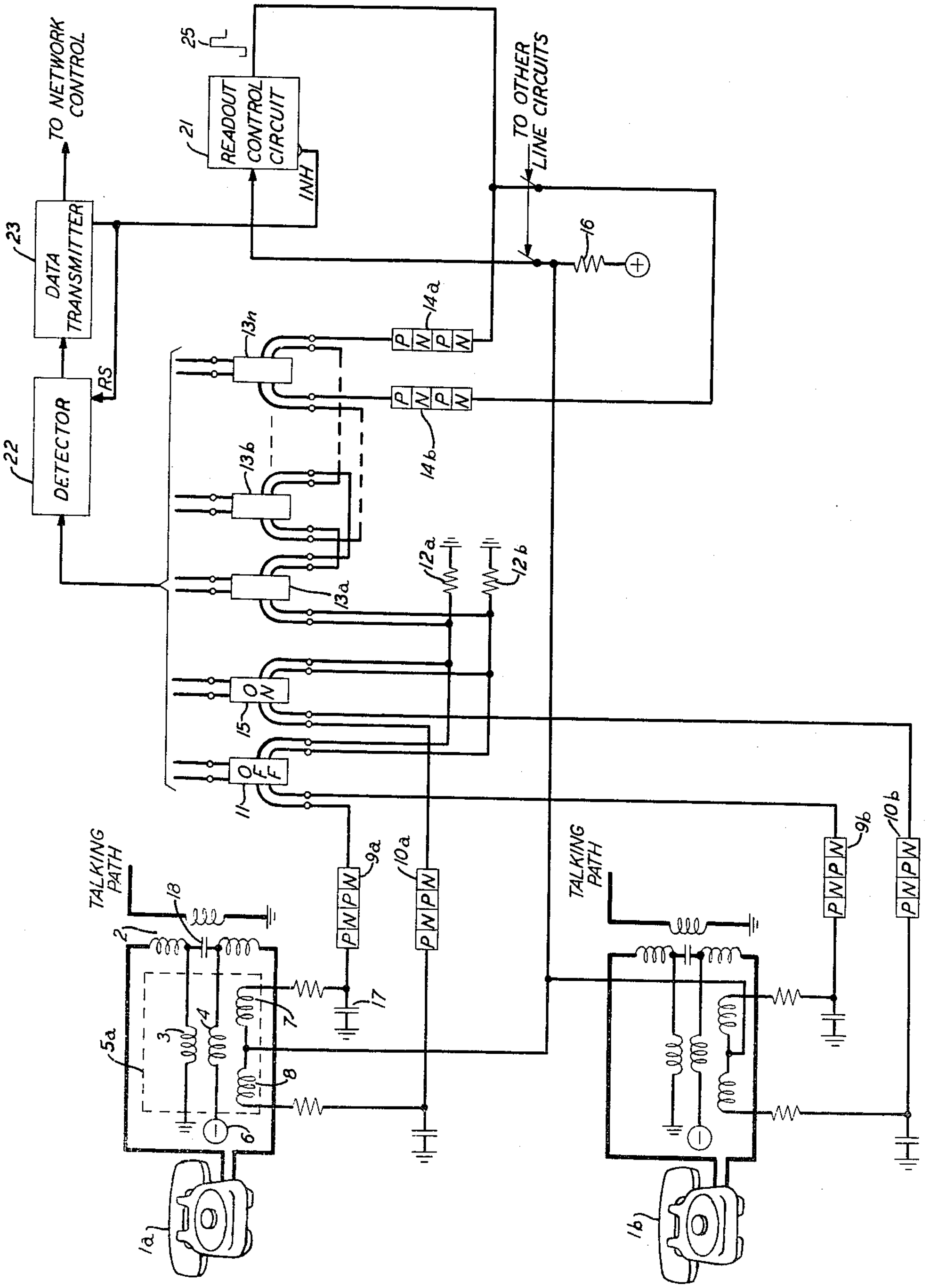
INVENTOR
O.H. WILLIFORD
BY Henry M. Bissell
ATTORNEY United States Patent Office 3,172,958
Patented Mar. 9, 1965

3,172,958
TELEPHONE LINE SUPERVISORY CIRCUIT

Oscar H. Williford, Bronxville, N.Y., assignor to Bell Telephone Laboratories, Incorporated, New York, N.Y., a corporation of New York Filed Apr. 5, 1960, Ser. No. 20,120
13 Claims. (Cl. 179—18)

This invention relates to telephone communication systems and more particularly to a line supervisory circuit for such a system.

In a telephone communication system some means must be provided for recognizing a subscriber's request for service. Such a service request is coordinated with the change of switch-hook condition in the subscriber's subset which thus may be used to indicate that a call is to be initiated or terminated. In electromechanical switching systems a line supervisory relay, controlled by the switch-hook, has generally been satisfactory for indicating a service request. However, in more recently developed electronic switching systems it is desirable that this function be performed by equipment of more rapid response which is capable of producing signals compatible with the remainder of the system.

Line supervisory circuitry for electronic control of a telephone system is known which employs a continuous scanning technique to determine successively and repeatedly the condition of the associated telephone lines. Any change in such condition between successive line scan cycles represents a service request by the line experiencing the change. It is desirable, however, particularly in applications such as a private branch exchange (PBX) system where the lines may not be used for normal telephone traffic except during business hours, to provide a line supervisory circuit which produces the desired result mentioned above without requiring continuous scanning of the associated telephone lines. Such a circuit reduces power consumption by eliminating the need for continuous scanning and further simplifies the associated equipment by doing away with more complex line scanning apparatus.

It is, therefore, a general object of this invention to improve the line supervisory circuitry employed in an electronic switching system.

More particularly, it is an object of this invention to eliminate the need for continuous scanning of telephone lines in order to determine the switch-hook condition of these associated lines.

Further objects of this invention are to simplify the line supervisory equipment of an electronic telephone switching network and to reduce the cost and power requirements of such equipment.

Specifically, it is an object of this invention to provide a telephone line supervisory circuit compatible with an electronic switching network which is capable of relaying a service request signal to the network without periodic line scanning.

One specific embodiment of this invention comprises a pair of circuit paths, each including a bistable semiconductor device, inductively connected to an individual telephone line. An induced electrical pulse, the polarity of which is determined by the particular change of line condition resulting when the associated telephone set goes either on-hook or off-hook, is selectively directed to one of these semiconductor bistable devices, which device then conducts electrical current to indicate that a change of line condition has occurred. Once triggered, the device remains conducting to prime a third semiconductor bistable device so that it may be triggered to its conducting state when pulsed by an associated readout control circuit. Current through the first-mentioned conducting bistable device applies a change of potential to the readout control circuit and causes it to produce a triggering pulse for the third semiconductor bistable device. This pulse triggers the primed third semiconductor bistable device, thus permitting current to pass through both the conducting bistable devices to equipment which identifies the line involved and the type of service requested. This information is directed through associated detecting and data transmitting circuitry to the network control equipment of the telephone switching system. Following the above-mentioned triggering pulse, the readout control circuit generates a pulse of the opposite polarity which restores the conducting bistable devices to their non-conducting state and the embodiment of the invention is again in condition to respond to succeeding service requests.

One distinct advantage provided by the above-mentioned specific embodiment of the invention, in accordance with an aspect thereof, results from the arrangement employed for inducing the triggering signal applied to the first-mentioned pair of bistable devices. To provide satisfactory service, the line supervisory circuit must be capable of distinguishing between true signals originating at the subset and so-called "hits" and "clicks" on the line (such as may be induced by lightning or power line surges) which may resemble such signals. Within the transformer coupling the line supervisory circuit of this invention to the line circuit itself, an arrangement is provided for canceling out the effects of these line hits so that such spurious signals have no effect on the line supervisory circuit while at the same time true switch-hook signals are coupled thereto. The transformer employed for this purpose has two primary windings which are connected on opposite sides of the line circuit. The variations of magnetic field produced by these windings in response to a change of switch-hook condition reinforce each other, thus inducing an electrical signal on the secondary windings in response to such a change. A line hit, however, produces magnetomotive forces on these two primary windings which tend to cancel each other, thus inducing a negligible signal on the secondary windings thereof which is adequate to cause the line supervisory circuit to respond as it does to a switch-hook signal.

It is a feature of this invention that a pair of bistable breakdown devices be selectively energized according to the polarity of an applied signal derived from a telephone set switch-hook in order to indicate both the occurrence of a change of switch-hook condition and the direction of such change of condition.

It is also a feature of this invention that a line-associated bistable breakdown device be primed by a circuit condition induced by a signal from a subset switch-hook so that a pulse of a particular polarity applied to the device will trigger it to its conducting state and thereby identify the particular telephone line originating the switch-hook signal.

It is a further feature of this invention to arrange a transformer having a pair of primary windings in order to distinguish between true and spurious signals applied in the primary winding circuit.

A complete understanding of this invention and of these and various other features thereof may be gained from consideration of the following detailed description and the accompanying drawing which depicts schematically one specific embodiment of the invention.

In the drawing, a pair of line circuits in accordance with the invention are shown connected in one line group. Appropriate circuitry for transferring information from these line circuits to a network control circuit also is shown associated therewith. The depicted circuits are merely representative of a larger number of such circuits which may be employed in a comprehensive telephone system. It will be clear to those skilled in the art that other such circuits may be added as indicated without exceeding the scope of my invention.

In the drawing, a pair of telephone subsets 1 are respectively connected to individual circuitry comprising one specific embodiment of the invention. The telephone set 1a is connected through a repeating coil 2 to primary windings 3 and 4 of a transformer 5a. It will be noted that the windings 3 and 4 are on opposite sides of the telephone line circuit and are connected respectively to ground and to a voltage source 6. The secondary windings 7 and 8 of the transformer 5a are individually connected to semiconductor PNPN diodes 9a and 10a, respectively. Such a diode is disclosed, for example, in "PNPN Transistor Switches," by J. L. Moll et al., vol 44, No. 9, Proceedings of the I.R.E., page 1174.

From the PNPN diode 9a a current path is provided through transformer 11 to one end of a resistor 12a which is connected to ground. An additional current path proceeds from the resistor 12a through transformer 13 to a PNPN diode 14a which in turn is connected to the output lead of a readout control circuit 21. A lead from the PNPN diode 10a passes through the transformer 15 and is connected to the resistor 12a, as in the path from the diode 9a. The midpoint of the secondary windings 7 and 8 is connected to a resistor 16 and also to the readout control circuit 21. The transformers 11, 13 and 15 are connected to a detector circuit 22, which may advantageously comprise a plurality of bistable elements, such as flip-flop stages known in the art, which are individually responsive to signals from the associated transformers. The detector circuit 22 is connected to a data transmitter 23 for directing the appropriate information identifying a line requesting service to equipment for providing that service. The data transmitter 23 may comprise arrangements known in the art such as, for example, that disclosed in the copending application of E. A. Irland, Serial No. 13,464, filed March 8, 1960, now Patent No. 3,121,-197, issued February 11, 1964.

The transformers 11, 13 and 15 are advantageously of the ring type known in the art having a toroidal core with a hollow center which may be threaded by one or more leads that constitute primary windings for the transformer. It will be noted that the transformers 13 are selectively threaded by individual leads in different patterns. Since the polarity of the output pulse of each transformer depends upon the direction of current on the lead threading its central aperture, each lead is arranged in a manner known in the art to provide a binary designation of the particular line with which it is associated. Thus when current is passed over a particular lead, the output terminals of the transformers 13 provide pulses in a pattern which corresponds to the binary address of the line in question. The transformers 13 serve as a translator similar to the ring type translator described by H. H. Schneckloth in "Some Basic Concepts of Translators and Identifiers Used in Telephone Switching Systems," vol. 30, Bell System Technical Journal (1951), page 588, at page 603. Other detecting devices may be substituted for the ring transformer detectors depicted in the drawing without exceeding the scope of my invention.

To understand the operation of the specific embodiment of this invention depicted in the drawing, let us assume that the on-hook condition exists at the telephone set 1a. The diodes 9a, 10a, and 14a are not conducting and there is no current flowing in the transformer 5a; however, diodes 9a and 10a are sufficiently forward-biased by the associated voltage sources to maintain a holding current once they are pulsed into a conducting state. When the handset is raised from the switch-hook of the telephone set 1a, a transient resulting from the initiation of current through winding 3 and 4 in the subscriber's loop generates a pulse in the secondary windings 7 and 8. These windings are poled in such a way that a positive pulse is applied to PNPN diode 9a while a negative pulse is directed to PNPN diode 10a. The positive pulse triggers the diode 9a, permitting current to flow through the resistors 16 and and 12a and thus changing the potential applied from the resistor 16 to the readout control circuit 21 to indicate that a change of line condition has occurred. While the readout control circuit 21 is thus energized by the voltage condition at the resistor 16, it applies a signal such as the bipolar pulse 25 to the PNPN diodes 14.

At the same time, current through the diode 9a changes the potential at the resistor 12a, which serves to prime the diode 14a so that it will be triggered into conduction by the negative pulse from the readout control circuit 21. when diode 14a is triggered, a pulse of current flows through diodes 14a and 9a and the transformers 11 and 13. The transformer 11 indicates to the detector circuit 22 that the change has been in the off-hook direction while the transformers 13 indicate to the detector circuit 22 the identity of the subset 1a experiencing the change of condition. On receiving this informatinon, the detector circuit 22 causes the data transmitter 23 to begin transferring the information to network control circuitry designed to act upon it in accordance with procedures well known in the telephone switching art. Meanwhile, the positive half of the bipolar pulse 25 is applied to the diodes 14, restoring the diodes 14a and 9a to the nonconducting state. The capacitor 17 is added to assist in turning off diode 9a.

During its operation, the data transmitter 23 applies an inhibiting signal to the readout control circuit 21, thus preventing it from applying additional pulses 25 to the diodes 14 before the detector 22 and data transmitter 23 are ready to handle succeeding line request information. Without this inhibiting signal, the readout control circuit 21 would continue to generate pulses 25 as long as any line circuit is in the service request condition; that is, as long as any PNPN diode 9 or 10 is in the conducting condition. After the data transmitter 23 finishes transferring the information from the detector circuit 22, it removes the inhibiting signal from the readout control circuit 21, applying at the same time a RESET pulse to the detector 22, thus preparing the latter for new information from the transformers 13 and 11 or 15 when the next PNPN diode 14 is triggered by a succeeding pulse 25.

The readout control circuit 21 thus comprises an inhibit gate or inhibitor, as well known in the art, receiving the signal indicating the change in the line condition at one input and the signal from the data transmitter 23 at its inhibit input. An example of a typical inhibitor is illustrated in "Arithmetic Operations in Digital Computers," by R. K. Richards, at page 46, FIGS. 2–12 and 2–13. Typically, the inhibitor provides an output signal if a signal is present on its input or inputs other than the inhibit input. A signal a the inhibit input overrides all other input signals and forces the inhibitor to remain at rest. The readout control circuit 21 also comprises a bipolar pulse generator which may take a variety of forms well known in the art; for example, the inhibitor output signal may be utilized to gate one cycle of a sine wave from an oscillator through a clipper or limiter circuit such as the double diode limiter illustrated in "Waveforms," by Chance, Hughes, MacNichol, Sayre and Williams, at page 46, Fig. 3.7 or the overdriven amplifier at page 160, Fig. 5.2 of the same volume, or a combination of the two. The resultant is the desired square wave output signal 25.

When the handset is replaced on the switch-hook of the telephone subset 1a, the resulting transient in the transformer 5a causes winding 7 to apply a negative pulse to the diode 9a while the winding 8 applies a positive pulse to the diode 10a. This triggers diode 10a to the conducting state and the operation of the circuit proceeds as has been described above except for the difference that the detector 22 receives an on-hook signal from the transformer 15.

In accordance with an aspect of this invention, the negative resistance characteristics of the PNPN diode are utilized to permit the connection of a plurality of line circuits to a common output lead of the readout control circuit 21. Even though more than one of the line circuits so connected may be in the service request condition, only one of the PNPN diodes 14 will be triggered in response to a negative pulse from the circuit 21 because the one which conducts first reduces the potential applied to the others and prevents their being triggered by that pulse.

As has already been mentioned, spurious transients such as power line surges developed on the line leading to a telephone subset, such as the instrument 1*a*, produce opposing magnetic fields on the windings 3 and 4 which tend to cancel each other. Thus, the line circuit of this invention distinguishes between a spurious transient which might otherwise be mistaken for a line signal and the true change of line condition signals which are produced by the switch-hook. This desirable result is enhanced by the provision of the capacitor 18 that serves to bypass the primary windings 3 and 4 completely for short-duration, high-frequency hits. It can thus be seen that the instant invention provides for the recognition of a change of line condition and the identification of the telephone subset producing this change of condition in a form which is compatible with electronic switching network control equipment. This desirable result is accomplished, in accordance with the invention, by a circuit which advantageously eliminates the necessity for continuous line scanning and the external memory circuitry formerly required for comparison purposes.

It is to be understood that the above-described arrangements are illustrative of the principles of the invention. Numerous other arrangements may be devised by those skilled in the art without departing from the spirit and scope of the invention.

What is claimed is:

1. In a telephone system having a plurality of lines, a supervisory circuit for detecting the occurrence of first and second line conditions comprising first and second switching means associated with each line, means for enabling said first and second switching means alternatively in response to said first and second line conditions respectively comprising means coupling said first and second switching means to the associated line in opposite polarity relationship, and means for increasing current flow through the enabled one of said first and second switching means to permit detection of a line condition change comprising a pulse source, means responsive to the enabling of one of said first and second switching means for activating said pulse source and third switching means enabled by a pulse from said source to complete a signal path between said source and said first and second switching means.

2. A line supervisory circuit for an electronic switching network having a plurality of telephone lines to be served comprising first and second bistable devices coupled to a corresponding one of said lines, means for selectively applying a triggering signal to said devices in accordance with the service to be afforded the corresponding line, a third bistable device connected to said first and second bistable devices, pulse means responsive to a particular condition of one of said first and second bistable devices for changing the state of said third bistable device, and means connected to said third bistable device for indicating the respective states of said first and second bistable devices.

3. A line supervisory circuit in accordance with claim 2 wherein said last-named means further includes means for generating coded signals distinctively identifying said line.

4. A line supervisory circuit in accordance with claim 2 further including means for inhibiting said pulse means during said indication of said respective states of said first and second bistable devices.

5. A line supervisory circuit in accordance with claim 2 wherein said bistable devices comprise semiconductor PNPN diodes.

6. A line supervisory circuit in accordance with claim 2 wherein said signal applying means comprises a transformer inductively coupling said first and second bistable devices to said corresponding line.

7. A line supervisory circuit in accordance with claim 6 wherein said transformer comprises a pair of primary windings connected to opposite terminals of said telephone line and a pair of secondary windings inductively coupled thereto and connected respectively to said first and second bistable devices.

8. A line supervisory circuit in accordance with claim 7 further comprising a capacitor connected between said pair of primary windings.

9. In an electronic telephone switching system a plurality of telephone lines, each comprising a switch-hook, a line supervisory circuit for each of said lines comprising a pair of bistable devices, means inductively coupling said pair of bistable devices to a respective one of said lines, a third bistable device connected in common to each of said pair of bistable devices, means for selectively triggering one of said pair of bistable devices in response to a change of condition of the switch-hook in the corresponding line, and pulse means responsive to said triggering of said one of said pair of bistable devices for triggering said third bistable device.

10. A line supervisory circuit in accordance with claim 9 wherein said pulse means includes means for restoring said triggered ones of said bistable devices to the quiescent condition.

11. A line supervisory circuit in accordance with claim 9 further comprising means responsive to a change of current level in said bistable devices including change identifying means inductively coupled to individual ones of said pair of bistable devices and line identifying means inductively coupled to said third bistable device.

12. A line supervisory circuit in accordance with claim 9 wherein said bistable devices comprise semiconductor PNPN diodes.

13. A line supervisory circuit in accordance with claim 9 further comprising impedance means connected to said pair of bistable devices for applying a priming potential to one side of said third bistable device.

References Cited in the file of this patent

UNITED STATES PATENTS

| | | |
|---|---|---|
| 2,715,657 | Andrews | Aug. 16, 1955 |
| 2,829,203 | Pitlick | Apr. 1, 1958 |